Aug. 18, 1931.   P. H. LANGE   1,819,249
SEAMING MECHANISM
Filed Aug. 7, 1929   6 Sheets-Sheet 3
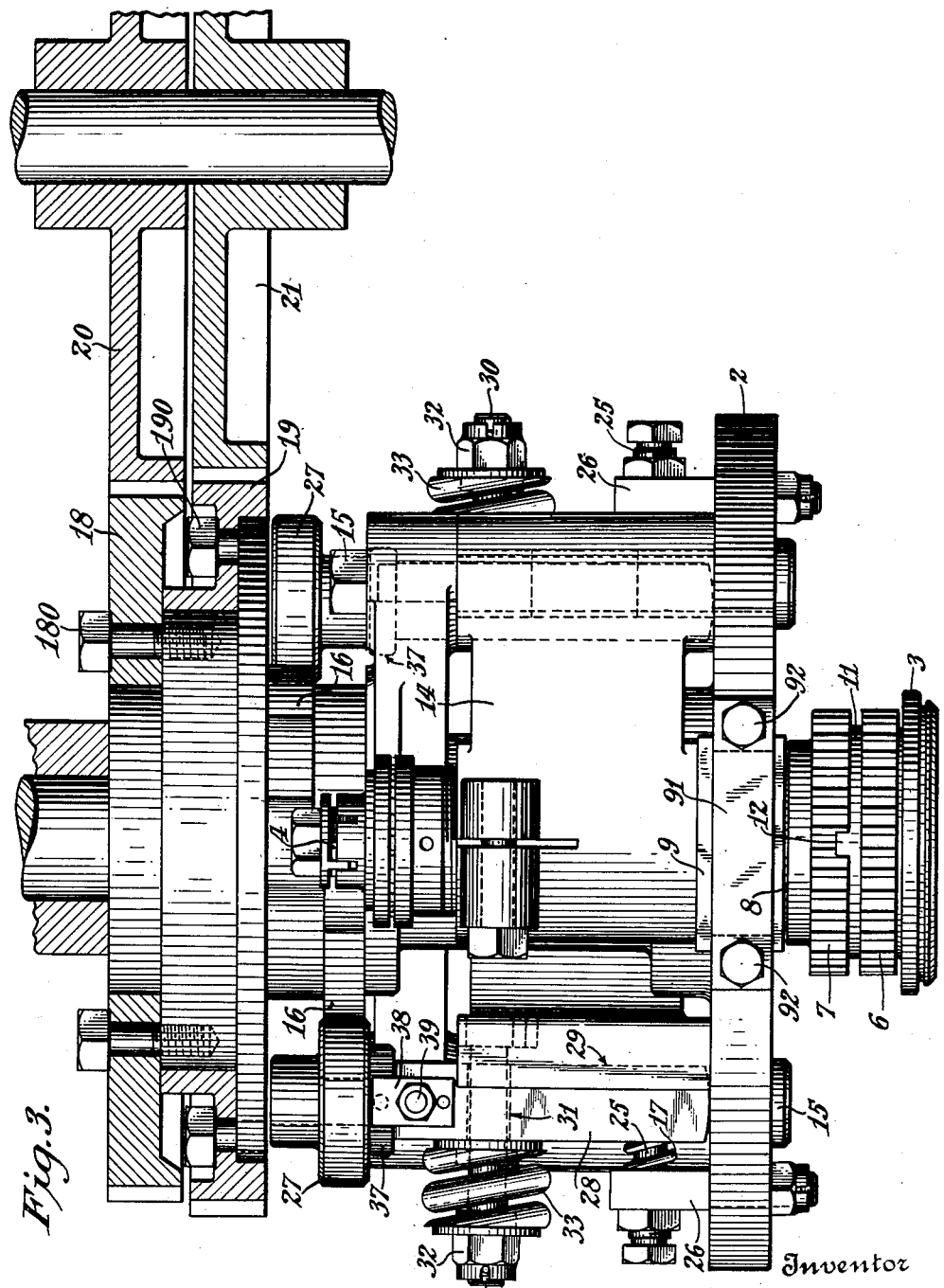

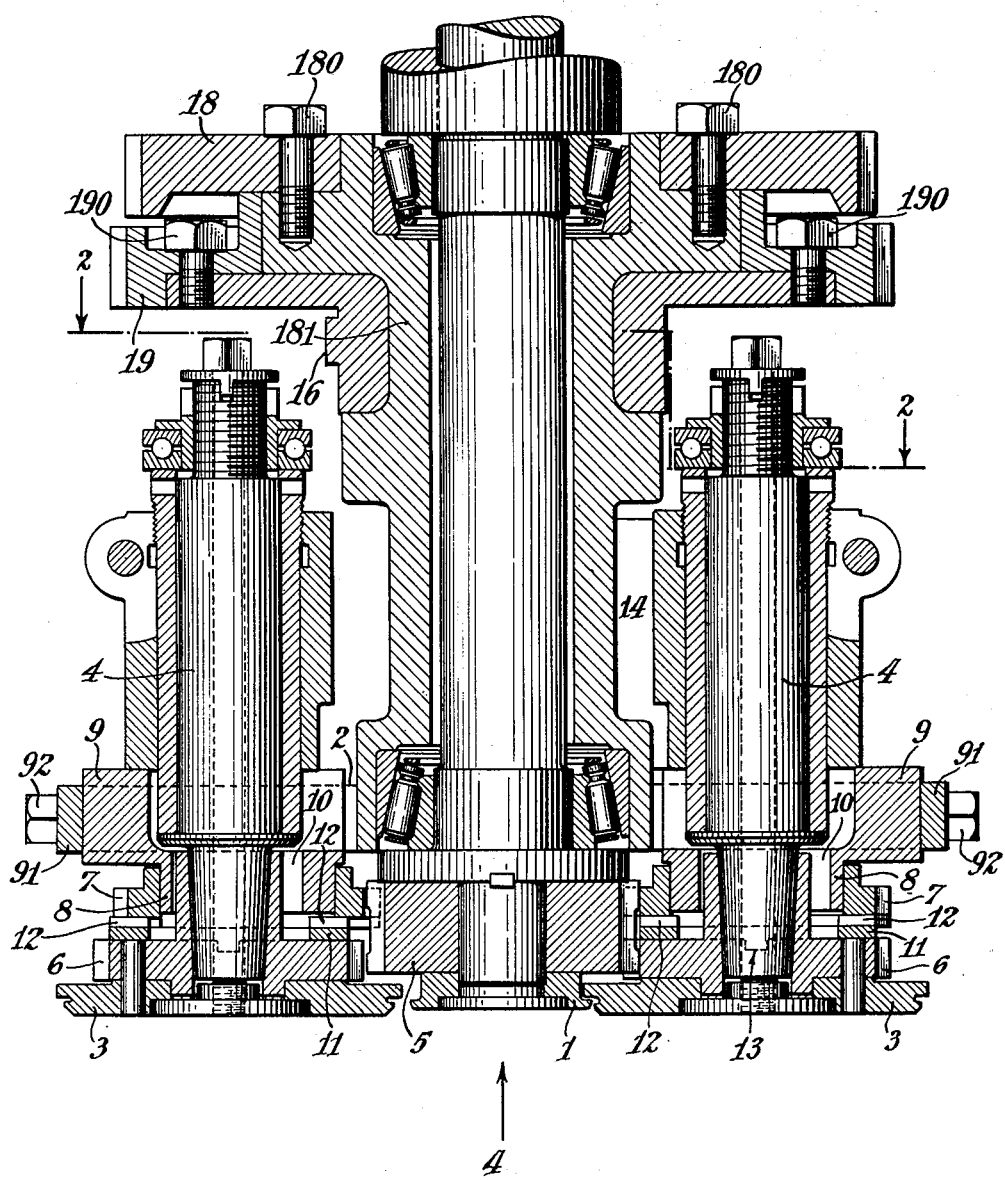

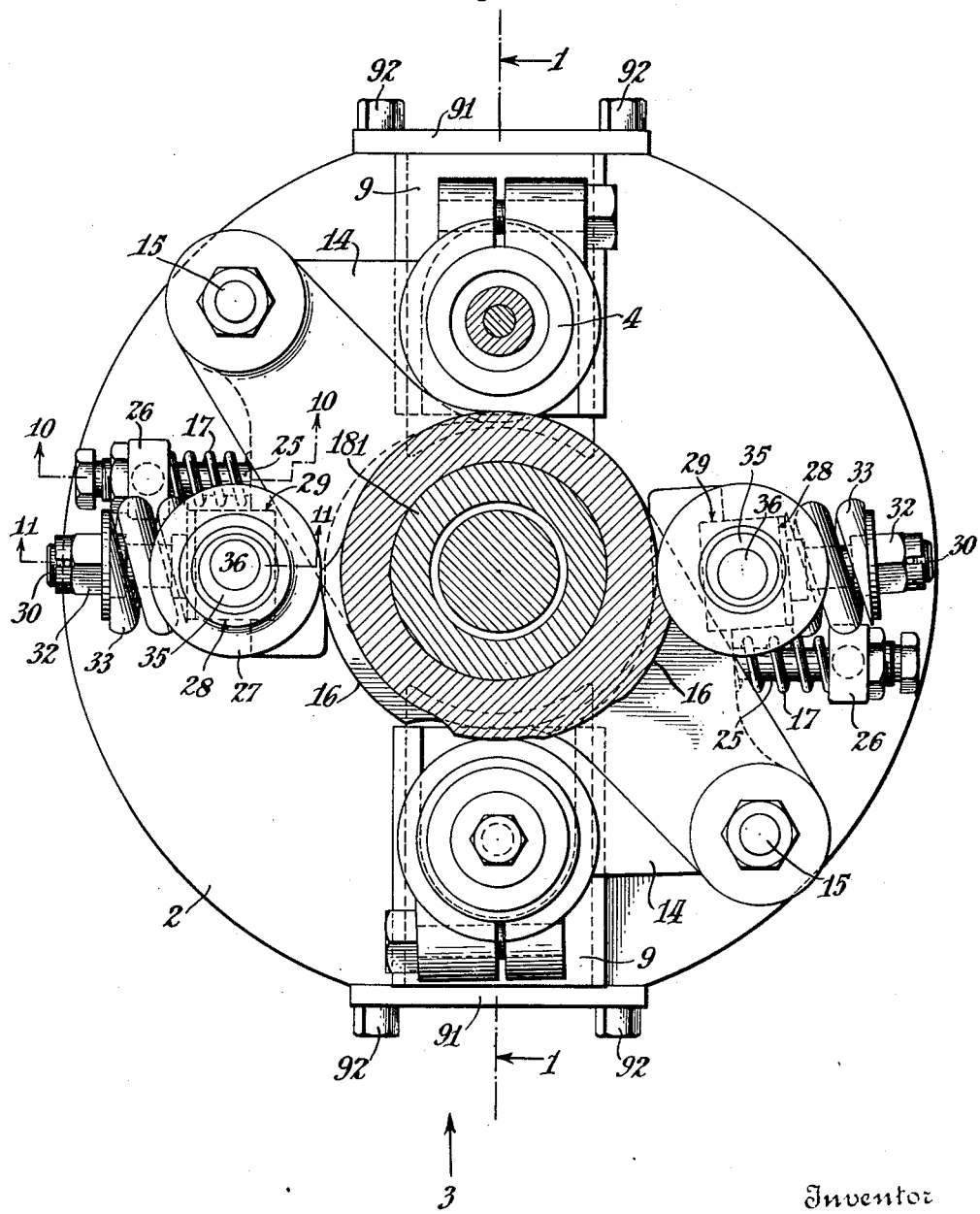

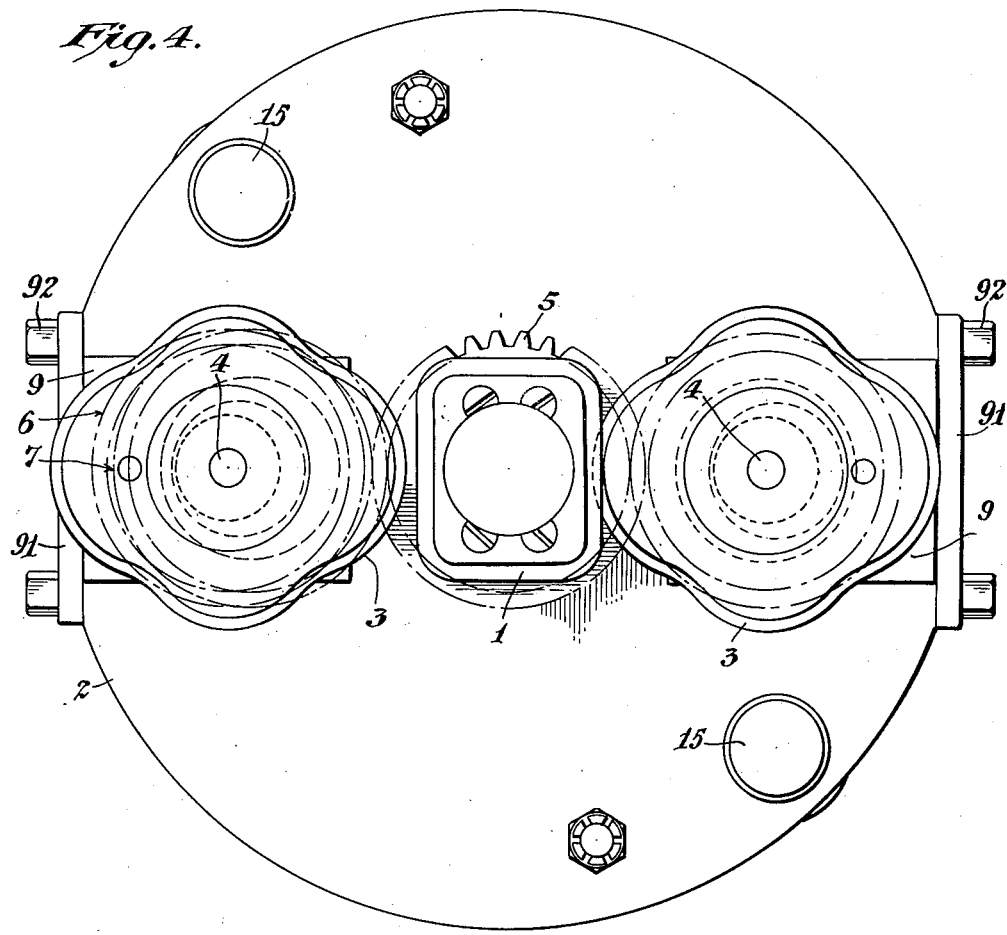
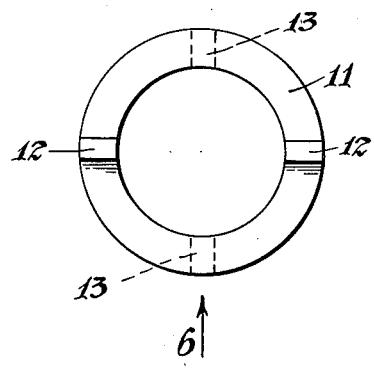
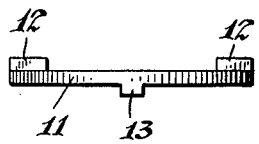

Aug. 18, 1931.　　　P. H. LANGE　　　1,819,249
SEAMING MECHANISM
Filed Aug. 7, 1929　　　6 Sheets-Sheet 5

Inventor
Paul H. Lange
By his Attorney

Aug. 18, 1931.  P. H. LANGE  1,819,249
SEAMING MECHANISM
Filed Aug. 7, 1929  6 Sheets-Sheet 6

Inventor,
Paul H. Lange
By his Attorney

Patented Aug. 18, 1931

1,819,249

UNITED STATES PATENT OFFICE

PAUL H. LANGE, OF BRIDGEPORT, CONNECTICUT, ASSIGNOR TO THE MAX AMS MACHINE COMPANY, OF BRIDGEPORT, CONNECTICUT, A CORPORATION OF NEW YORK

SEAMING MECHANISM

Application filed August 7, 1929. Serial No. 384,152.

This invention relates generally to seaming mechanism such as is used to unite can bodies and caps or covers and has for its main object and feature the production of a simple and compact structure, capable of high speed, for uniting bodies and covers.

In the accompanying drawings the invention is disclosed in a concrete and preferred form in which:

Fig. 1 is a vertical sectional view substantially on the plane of line 1—1 of Fig. 2 showing a seaming mechanism embodying the invention;

Fig. 2 is partly a top plan view and partly a horizontal sectional view substantially on the plane of line 2—2 of Fig. 1;

Fig. 3 is a view mainly in side elevation, but partly in section, looking in the direction of arrow 3 of Fig. 2;

Fig. 4 is a bottom plan view of the seaming head looking in the direction of arrow 4 of Fig. 1;

Figs. 5 and 6 are detailed views of the compensating transmission device;

Figure 7:
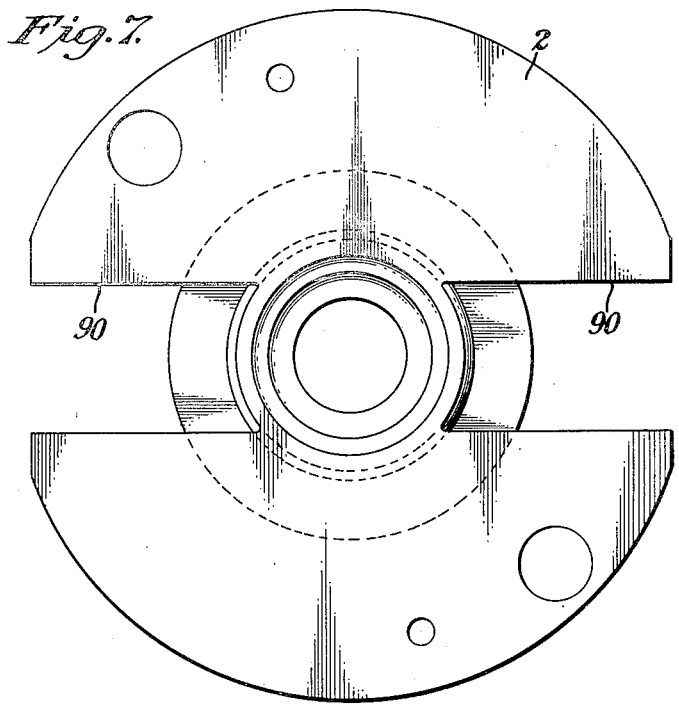
Fig. 7 is a detached plan view of the seaming head.
Figure 8:
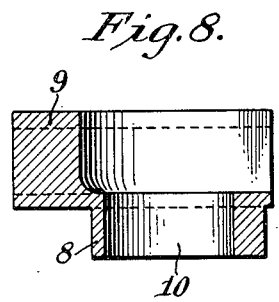
Fig. 8 is a sectional view of a seaming head bracket.
Figure 9:
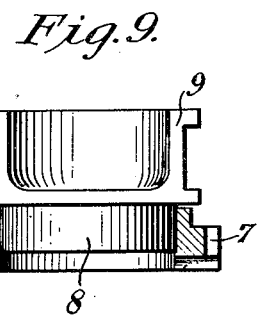
Fig. 9 is a view in elevation of the seaming head bracket and its gear supporting bushing.
Figure 10:
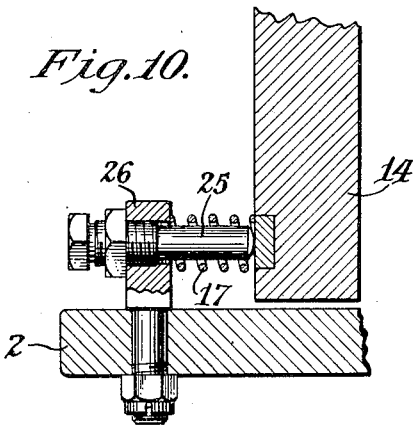
Fig. 10 is a detail sectional view substantially on the plane of line 10—10 of Fig. 2.
Figure 11:
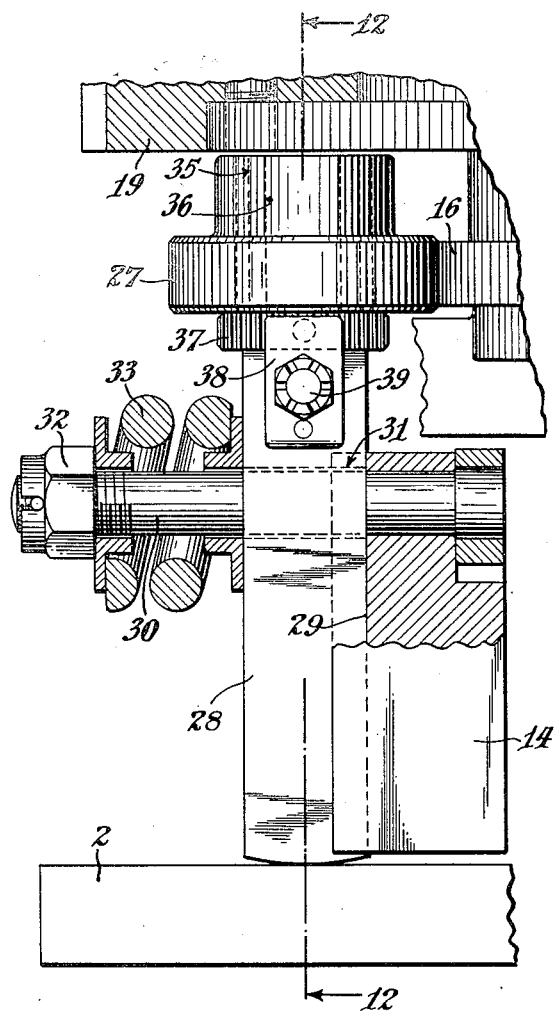
Fig. 11 is a detail sectional view substantially on the plane of line 11—11 of Fig. 2.
Figure 12:
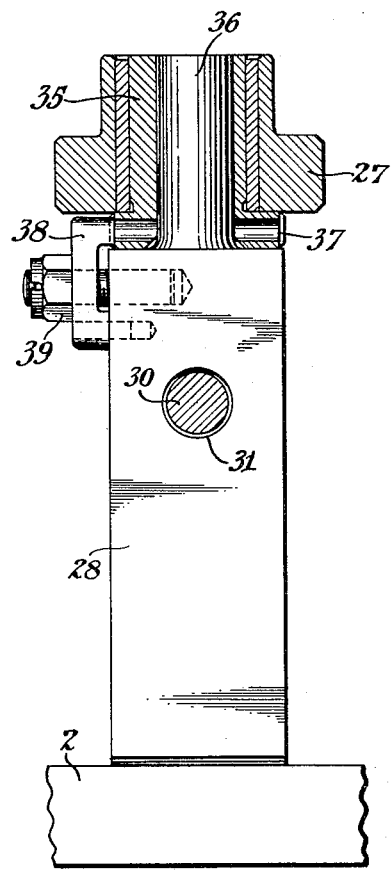
Fig. 12 is a sectional detail view substantially on the plane of line 12—12 of Fig. 11.

The mechanism comprises the two usual elements having a relative revolving motion, one with relation to the other, one element constituting a workholder 1 and the other a seaming head 2. In the present embodiment of the invention the workholder is stationary and the seaming head rotates. The seaming head carries one or more seaming tools, in the present case two, but since both are constructed alike only one of these will be described.

In Fig. 4 is shown the outline of seaming rollers 3 and workholder 1, from which it appears that the work and the seaming rollers are non-circular and it will be understood that a seaming roller must be rotated about its own axis in timed relation to the relative revolving motion of workholder 1 and seaming head 2, to thereby present correctly varying configurations of seaming surfaces to the complementary configuration of the work. It will also be understood that the seaming roller must be moved toward and away from the work and that it is essential to maintain the timed relation while the parts are disengaged so that when they reengage they will properly cooperate to effect the seaming operation. To effect this desirable result in such a way that the machine can be run at high speed, I resort to the following expedient which I shall describe in its preferred form:

Seaming roller 3 is mounted on a spindle 4 and, in the present instance, the spindle and roller are rotatable in unison, that is, the seaming roller is fast on the spindle, and the latter is rotatable in suitable bearings on head 2. This spindle (and roller) is movable toward and away from the workholder by any suitable means such as those to be presently described. In any event, the movement is preferably of such character that the axis of the seaming roller remains substantially parallel to the axis of the workholder at all times. The workholder is provided with a gear 5, and with this latter mesh two gears 6 and 7 that are arranged side by side but in spaced relation with respect to each other and are carried by the seaming head. One of these gears, 6, is fast on spindle 4 or is otherwise so connected to roller 3 that they rotate in unison, while the other, 7, is mounted to freely revolve about spindle 4. To this end it will be observed that a bushing 8, formed as an extension of bracket 9 of the seaming head, is provided on which said gear 7 rotates. Bushing 8 is, however, provided with an opening 10 of such amplitude that the reduced portion of spindle 4 may move freely back and forth to effect the in-and-out movement of the seaming tool toward and away from the work. Bracket 9 is mounted in a cut-out portion 90 of seaming head 2 and is held in place by a strap 91 and bolts 92. It will now be observed that when seaming roller 3 moves outwardly it will carry gear 6 with it (as shown at the left-hand side of Fig. 1) whereby said gear will be moved out of mesh with gear 5, while gear 7 will remain in mesh with gear 5. In order to maintain proper rotation of gear 6 and to assure proper reengagement of 6 and 5 when the seaming roller approaches the work, I interpose a compensating transmission device between gears 6 and 7. As here shown, this device is in the form of a ring or disc 11 having slidable connection with gears 6 and 7, this being effected here by providing said disc 11 with two sets of radial guides 12 and 13 at right angles to each other, guides 12 engaging in slots of gear 7 and guides 13 in slots of gear 6. It will now be evident that rotation imparted to gear 7 by gear 5 will be transmitted to gear 6 by device 11, and that this will occur even when gear 6 is out of mesh with 5. Therefore, gear 6 will always be properly timed with respect to gear 5 and when said gears return into mesh they will do so smoothly and without jar.

As previously indicated, any suitable means may be provided to move spindle 4 and roller 3 toward and away from the work. As here shown, spindle 4 is carried by a bell crank 14 pivoted at 15, said bell crank being actuated by a cam 16 against which it is held by spring 17.

The conventional gearing to operate the parts consists here of a gear 18 connected by bolts 180 to sleeve 181 that carries seaming head 2, and a gear 19 connected by bolts 190 to cams 16. Gears 18 and 19 are operated by gears 20 and 21 and, as shown, there is a difference in the diameter of gears 18 and 19 of such amplitude that cams 16 have one effective revolution, during each seaming cycle, with respect to the seaming head.

The seaming roller mounting also involves new features of construction and is as follows: Spring 17 is mounted on stem 25 which acts as a stop against 14 to limit movement of seaming roller 3 toward the work, the position of stop 25 being so adjustable in bracket 26 that the seaming roller cannot come in contact with the surface of chuck 1. 27 is a cam roller, to engage cam 16, carried by a tiltable support 28. This tiltable support is square in cross section, except at the point where it carries cam roller 27, and is seated in a square recess 29 of one of the arms of bell crank 14. The lower rounded end of support 28 rests on seaming head 2, and about midway of the length of said support there is provided a pin 30 that passes through an opening 31 in said support, said opening being large enough to provide a considerable amount of clearance. One end of said pin extends into and is secured in bell crank 14 and the other end thereof carries an adjustable nut or head 32 between which and support 28 is interposed a spring 33. It will now be understood that when the seaming roller encounters an unusual obstruction such as the side seam of a can, said seaming roller may move outwardly notwithstanding engagement of cam 16 with cam roller 27, as spring 33 will permit support 28 to tilt on its lower rounded surface to a slight degree. Cam roller 27 may, if desired, be rotatably mounted on eccentric bushing 35 and this eccentric bushing is adjustable on stem 36. 37 is a gear or ratchet member, having very fine teeth, fixed on the eccentric bushing. Adjacent to 37 is a member 38 having also very fine teeth, said member 38 being bolted at 39 to member 28. It will be understood that by loosening bolt 39 and disengaging 37 and 38, the eccentric bushing can be turned and that owing to the fineness of the teeth of the two members a very nice adjustment can be made and the parts retained in the newly adjusted position by reengaging 37 and 38.

The arrangement is here shown in duplicate, that is, there are two seaming rollers and equipment acting alternately and two cams 16.

I claim:

1. Seaming mechanism including: two elements having a relative revolving motion one with respect to the other, one element constituting a workholder and the other a seaming head, a non-circular seaming tool, carried by the head, rotatable about its own axis in timed relation to the relative revolving motion of the two elements to thereby present correctly varying configurations of seaming surfaces to the complementary configuration of the work, a gear on the workholder, two gears, carried by the head, side by side but in spaced relation with respect to each other, to mesh with the gear on the workholder, one of said gears rotating with the seaming tool and the other mounted to revolve freely, an actuating device to move the seaming tool toward and away from the workholder and to move the gear that rotates with the seaming tool into and out of mesh with the gear on the workholder, and a compensating transmission device interposed between and spacing the two gears carried by the head to thereby drive the gear that rotates with the seaming tool in synchronism with the gear on the workholder while it is out of mesh with the latter.

2. Seaming mechanism including: two elements having a relative revolving motion one with respect to the other, one element constituting a workholder and the other a seaming head, a non-circular seaming tool, carried by the head, rotatable about its own axis in time relation to the relative revolving motion of the two elements to thereby present correctly varying configurations of seaming surfaces to the complementary configuration of the work, a gear on the workholder, two gears, carried by the head, side by side but in spaced relation with respect to each other, to mesh with the gear on the workholder, one of said gears rotating with the seaming tool and the other mounted to revolve freely, a pivoted lever to move the seaming tool toward and away from the workholder and to move the gear that rotates with the seaming tool into and out of mesh with the gear on the workholder, and a compensating transmission device interposed between and spacing the two gears carried by the head to thereby drive the gear that rotates with the seaming tool in synchronism with the gear on the work holder while it is out of mesh with the latter.

3. Seaming mechanism including: two elements having a relative revolving motion one with respect to the other, one element constituting a workholder and the other a seaming head, a non-circular seaming tool, carried by the head, rotatable about its own axis in timed relation to the relative revolving motion of the two elements to thereby present correctly varying configurations of seaming surfaces to the complementary configuration of the work, a gear on the workholder, two gears, carried by the head, side by side but in spaced relation with respect to each other, to mesh with the gear on the workholder, one of said gears rotating with the seaming tool and the other mounted to revolve freely, an actuating device to move the seaming tool toward and away from the workholder and to move the gear that rotates with the seaming tool into and out of mesh with the gear on the workholder, and a compensating transmission disc interposed between and spacing the two gears carried by the head to thereby drive the gear that rotates with the seaming tool in synchronism with the gear on the workholder while it is out of mesh with the latter.

4. Seaming mechanism including: a cam and a seaming head having a relative revolving motion one with respect to the other, a bell crank pivotally supported on the seaming head, a seaming tool carried by one arm of the bell crank, a cam roller to engage the cam, a spring-pressed tiltable support on the other arm of the bell crank, said support carrying the cam roller to thereby admit of an extra outward movement of the seaming tool notwithstanding engagement of the cam and cam roller, and means to yieldingly press said other arm toward the cam.

5. Seaming mechanism including: a cam and a seaming head having a relative revolving motion one with respect to the other, a bell crank pivotally supported on the seaming head, a seaming tool carried by one arm of the bell crank, a cam roller to engage the cam, a spring-pressed tiltable support on the other arm of the bell crank, said support carrying the cam roller to thereby admit of an extra outward movement of the seaming tool notwithstanding engagement of the cam and cam roller, means to yieldingly press said other arm toward the cam, and a stop to engage said other arm to limit the inward movement of the seaming tool toward the work.

6. Seaming mechanism including: two elements having a relative revolving motion one with respect to the other, one element constituting a workholder and the other a seaming head, a non-circular seaming tool, carried by the head, rotatable about its own axis in timed relation to the relative revolving motion of the two elements to thereby present correctly varying configurations of seaming surfaces to the complementary configuration of the work, a gear on the workholder, a bushing carried by the head, a gear freely revoluble on the exterior of said bushing and in constant mesh with the gear on the workholder, a seaming tool spindle of smaller diameter than and extending through the interior of the bushing, a gear connected to rotate with the seaming tool, a pivoted lever on the head to support the seaming tool spindle, means to turn the lever about its pivot to thereby move the seaming tool toward and away from the workholder and to move the gear that rotates with the seaming tool into and out of mesh with the gear on the workholder, and a compensating transmission device connecting the gear on the bushing and the gear that rotates with the seaming tool to thereby drive said last-mentioned gear in synchronism with the gear on the workholder while it is out of mesh with the latter.

7. Seaming mechanism including: two elements having a relative revolving motion one with respect to the other, one element constituting a workholder and the other a seaming head, a non-circular seaming tool, carried by the head, rotatable about its own axis in timed relation to the relative revolving motion of the two elements to thereby present correctly varying configurations of seaming surfaces to the complementary configuration of the work, a gear on the workholder, two gears carried by the head to mesh with the gear on the workholder, one of said gears rotating with the seaming tool and the other mounted to revolve freely, an actuating device, including a cam and cam roll, to move the seaming tool toward and away from the workholder and to move the gear that rotates with the seaming tool into and out of mesh with the gear on the workholder, a compensating transmission device connecting the two gears carried by the head to thereby drive the gear that rotates with the seaming tool in synchronism with the gear on the workholder while it is out of mesh with the latter, and means to admit of an extra outward movement of the seaming tool notwithstanding engagement of the cam and cam roller.

Signed at New York, in the county of New York, and State of New York, this 30th day of July, 1929.

PAUL H. LANGE.